United States Patent
Fligg et al.

[19]
[11] Patent Number: 6,010,170
[45] Date of Patent: Jan. 4, 2000

[54] FINGER-MOUNTED-CAKE DECORATING DEVICE AND METHOD

[76] Inventors: Timothy J. Fligg, 709 Merlin Dr., Schaumburg, Ill. 60193; Jacqueline K. Celano, 2300 N. Harlem Ave., Elmwood Park, Ill. 60635

[21] Appl. No.: 09/137,055

[22] Filed: Aug. 20, 1998

Related U.S. Application Data

[63] Continuation of application No. 08/958,800, Oct. 27, 1997, Pat. No. 5,871,245.

[51] Int. Cl.⁷ ..................................................... A23G 3/28
[52] U.S. Cl. ............................................. 294/25; 426/383
[58] Field of Search .................................. 294/1.1, 7, 25; 30/298; 224/217; 426/104, 383

[56] References Cited

U.S. PATENT DOCUMENTS

| | | | |
|---|---|---|---|
| 126,565 | 5/1872 | Mitchell | 30/298 |
| 319,070 | 6/1885 | Clark | 294/25 |
| 885,569 | 4/1908 | Bergquist | 294/25 |
| 1,035,008 | 8/1912 | Hendrick | 294/25 |
| 1,547,863 | 7/1925 | Dulin | 30/298 |
| 1,976,653 | 10/1934 | Brueck | 224/217 |
| 2,491,860 | 12/1949 | Ingraham | 294/25 |
| 3,014,506 | 12/1961 | Crimmins et al. | 30/298 |
| 4,024,287 | 5/1977 | Golchert | 426/383 |
| 4,797,974 | 1/1989 | Smith, Jr. | 294/25 |

*Primary Examiner*—Dean J. Kramer
*Attorney, Agent, or Firm*—Mathew R. P. Perrone, Jr.

[57] ABSTRACT

A finger-mounted, cake decorating device, which can receive and place a decoration, has a finger receiver with a protruding platform extending therefrom. A decoration is formed on either a rose nail or a rod. The platform receives the decoration as formed and permits a transfer of the decoration to a desired position.

6 Claims, 6 Drawing Sheets

FINGER-MOUNTED-CAKE DECORATING DEVICE AND METHOD

CROSS REFERENCE TO RELATED APPLICATION

This application is a continuation of U.S. patent application Ser. No. 08/958,800, now U.S. Pat. No. 5,871,245 filed Oct. 27, 1997, by the same inventive entity.

This invention relates to a cake decorating device and more particularly to a cake decorating device capable of being mounted on a finger, which can then have an appropriate cake decoration formed thereon and removed therefrom with reduced processing steps.

BACKGROUND OF THE INVENTION

In the catering business, a restaurant, and other professional food suppliers, it is customary to provide decorations on food. Typical decorations of this type appear on cakes and similar items. Some of these decorations include icing or frosting shaped in the form of flowers.

In a typical fashion, these flowers are shaped on a platform. Various parts of the flower are supported on the platform as the skill of the chef or artist applies each part thereof to the desired platform with one tool. As layers of frosting build up, the flower or other decorating then becomes complete. The chef then puts the one tool down and picks up another tool in order to remove the flower from the platform and then to apply that decoration to the cake or other desired surface.

Of course, other decorations besides flowers can be made in this way. However, the standard procedure in the art is to put this edible and shapeable material in a controllable dispenser, apply the material from the dispenser to a rod or a platform with various steps in various shapes, complete the final design, lay down the application device, pick up a scraping tool, scrape off the design, and apply it to the cake's surface.

In the bakery trade, the platform is commonly part of tool called the rose nail. The rose nail includes a flat surface substantially circular in nature and supported by a center rod mounted substantially perpendicular thereto and on one side thereof. Thus is an appropriate decorating support or rose nail formed. The decoration is formed and received on the opposing side of the flat surface of the decorating support away from the rod.

In the bakery trade, the rod is used to support the forming of a design. Various layers of material are applied in a desired pattern around the rod. The design must then be pushed upwardly off of the rod and applied to the cake.

If any one of these steps can be eliminated, great advantages can be obtained. When more than one step is eliminated, the advantages progress geometrically.

SUMMARY OF THE INVENTION

Therefore, among the many objectives of this invention is to provide a finger-mounted, decorating device, which can aid in the formation, deliver a decoration to a desired spot and remove the decoration from the device.

A further objective of this invention is to provide a decorating device which eliminates a tool.

A still further objective of this invention is to provide a decorating which eliminates a decorating step.

Yet a further objective of this invention is to provide a decorating device, which is easily handled.

Also an objective of this invention is to provide a method for decorating a food.

Another objective of this invention is to provide a method for decorating a food in a simpler fashion.

These and other objectives of the invention (which other objectives become clear by consideration of the specification, claims and drawings as a whole) are met by providing a finger-mounted, cake decorating device which can receive and place a decoration.

BRIEF DESCRIPTION OF DRAWINGS

Throughout the figures of the drawings, where the same part appears in more than one figure of the drawings, the same number is applied thereto.

DESCRIPTION OF THE PREFERRED EMBODIMENTS

Figure 1:
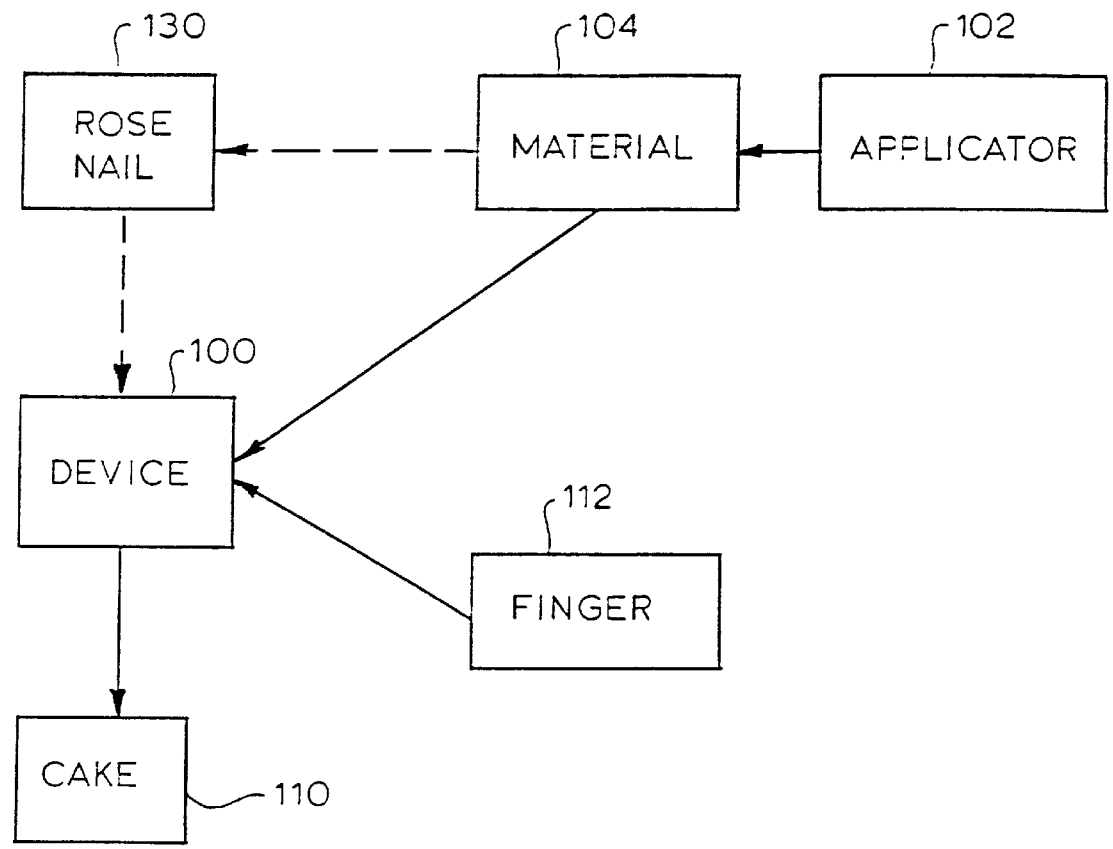
FIG. 1 depicts a block diagram illustrating the use of finger-mounted, cake decorating device 100 in use to decorate a cake 110.

This decorating device provides for shaping decorations for food. More particularly, this device provides for making flowers or other cake decorations to be used on a cake. The device mounts on the finger.

This finger-mounted cake decorating device includes a finger receiver. Extending from the finger receiver is a protruding platform adapted to receive a decoration. The decoration is formed from icing or other food material, which may be squirted or otherwise applied to a surface in an appropriate design. The appropriate design is then moved to the surface of the food desired to be decorated.

Assuming that a flat surface is used to form the decoration, it is possible for the flat surface to be circular in nature and be supported by a center rod mounted substantially perpendicular thereto and on one side thereof. Thus is an appropriate decorating support formed. The decoration is formed and received on the opposing side of the flat surface of the decorating support away from the rod.

After the decoration is formed on the flat surface, the finger-mounted cake decorating device may remove the decoration to the protruding platform. Contact of the cake or other desired surface with the protruding platform permits the decoration to be removed therefrom, without the necessity picking up another implement to accomplish the transfer to the protruding platform.

This particular finger receiving cake decorating device includes a ring, which fits onto a finger. The ring may have an adjustable size or a permanent size. If it is permanent, the ring size can be made to suit the finger of a particular chef. The chef slips the device on a finger, preferably the forefinger. The fixed ring is made especially for the chef. The adjustable ring can be used by many chefs of different finger sizes.

On one side of ring, extends the protruding, decorating platform. The decorating platform may be flat arced upwardly away from the finger. The protruding platform includes a two pronged device having a isosceles triangular shape cut out of the middle of the device. The vertex of the isosceles triangle is adjacent to the ring. The arms of the triangle are longer than the base. The resulting two prongs are also generally shaped like an isosceles triangle.

In one preferred forming method, the icing or other material is formed into the desired shape on the platform of a rose nail. The desired shape is then transferred to the protruding platform of the finger mounted cake decorating device. The chef then contacts the cake or other desired surface, and places the flower thereon. A simple push may be used to remove the decoration if necessary without the necessary scrapping step or other action.

In another preferred forming method, the icing or other material is formed into the desired shape on a rod, near one end of the rod. The rod is then placed between the prongs of the two pronged device. An upward scraping motion then moves the desired shape onto the protruding platform of the finger mounted cake decorating device. The chef then contacts the cake or other desired surface, and places the flower thereon. A simple push may be used to remove the decoration if necessary. It may also be possible to avoid a scraping step or other action to remove the decoration from protruding platform.

In certain circumstances, it is possible for the icing or other material may be squirted or otherwise applied directly to the protruding platform in the appropriate design. This may eliminate the use of the decorating support or rose nail, in that instance. Contact of the cake or other desired surface with the protruding platform permits the decoration to be removed therefrom, and applied to the surface more directly.

Figure 5:
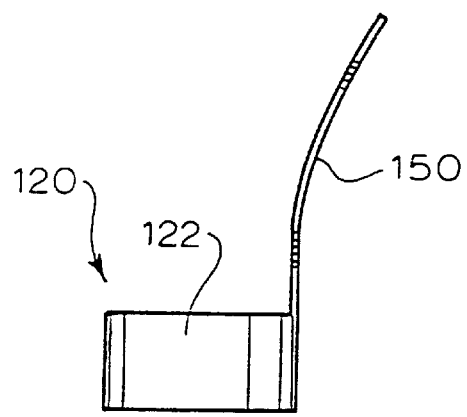
FIG. 5 depicts a side view of finger-mounted, cake decorating device 100.

As shown in use in FIG. 5, finger-mounted, cake decorating device 100 includes a fixed finger receiver 120 with a decorating platform 150 extending or protruding therefrom. This decorating device 100 moves the design 106 to a desired surface. Clearly design 106 may also be formed directly on platform 150, and moved to cake 110 by moving finger of hand 112 appropriately.

In one procedure, the applicator 102 applies a moldable, edible material 104 to rose nail 130 or to decorating protruding platform 150, as many times as desired until design 106 is formed. Design 106 is then preferably transferred from rose nail 130 to platform 150 to cake 110 by moving finger of hand 112 appropriately.

Figure 10:
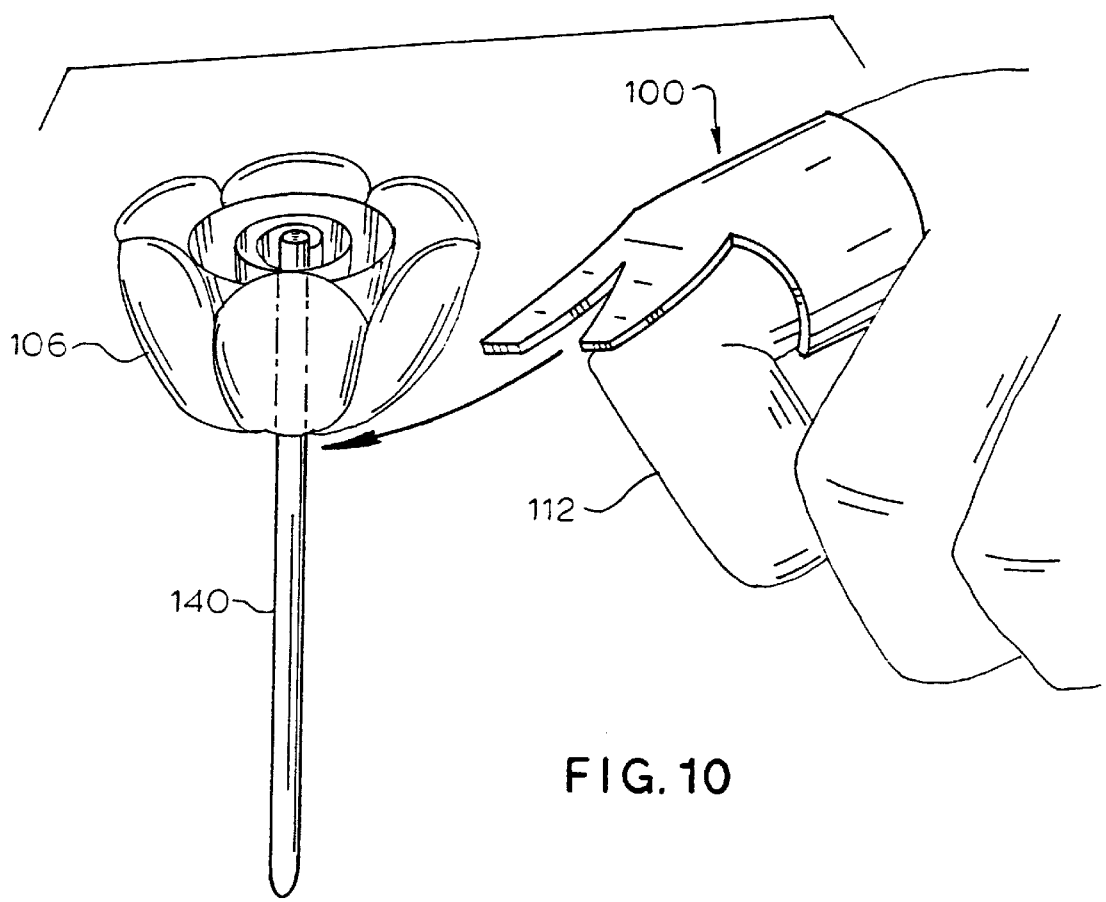
FIG. 10 depicts a top, front perspective view of finger-mounted, cake decorating device 100 in use with decorating rod 140.

In another procedure as shown in FIG. 10, the applicator 102 applies a moldable, edible material 104 near the end of a rod 140 and around the rod 140, as many times as desired until design 106 is formed. Design 106 is then preferably transferred from rod 140 to platform 150 to cake 110 by placing rod 140 between first prong 152 and a second prong 154 (FIG. 3) of platform 150 extending from finger receiver 120 and sliding upwardly.

Adding FIG. 2, FIG. 4, FIG. 5 and FIG. 6 for consideration, the structure of finger-mounted, cake decorating device 100 becomes clear. This finger-mounted cake decorating device 100 includes a fixed finger receiver 120. Extending from the fixed finger receiver 120 is a decoration receiving platform 150. On one side of finger receiver 120 extends decoration receiving platform 150.

Finger receiver 120 includes a band 122 around and forming an aperture 124. Aperture 124 receives the desired finger 112 in order for the finger-mounted cake decorating device 100 to be used.

Decoration receiving platform 150 includes a first prong 152 and a second prong 154 extending from finger receiver 120. Preferably first prong 152 and second prong 154 each have the shape of an isosceles triangle. First prong 152 has first base 156, and second prong 154 has second base 158 adjacent to finger receiver 120. Between first prong 152 and second prong 154, a support space 160 appears. Support space 160 also has the shape of a isosceles triangular with the support vertex 162 adjacent to finger receiver 120.

Preferably, first prong 152 and second prong 154 have a slight upward arc (shown in FIG. 5) away from hand 112. Such an arc simplifies the use of cake decorating device 100, and provides for easier transfer of design 106.

Figure 2:
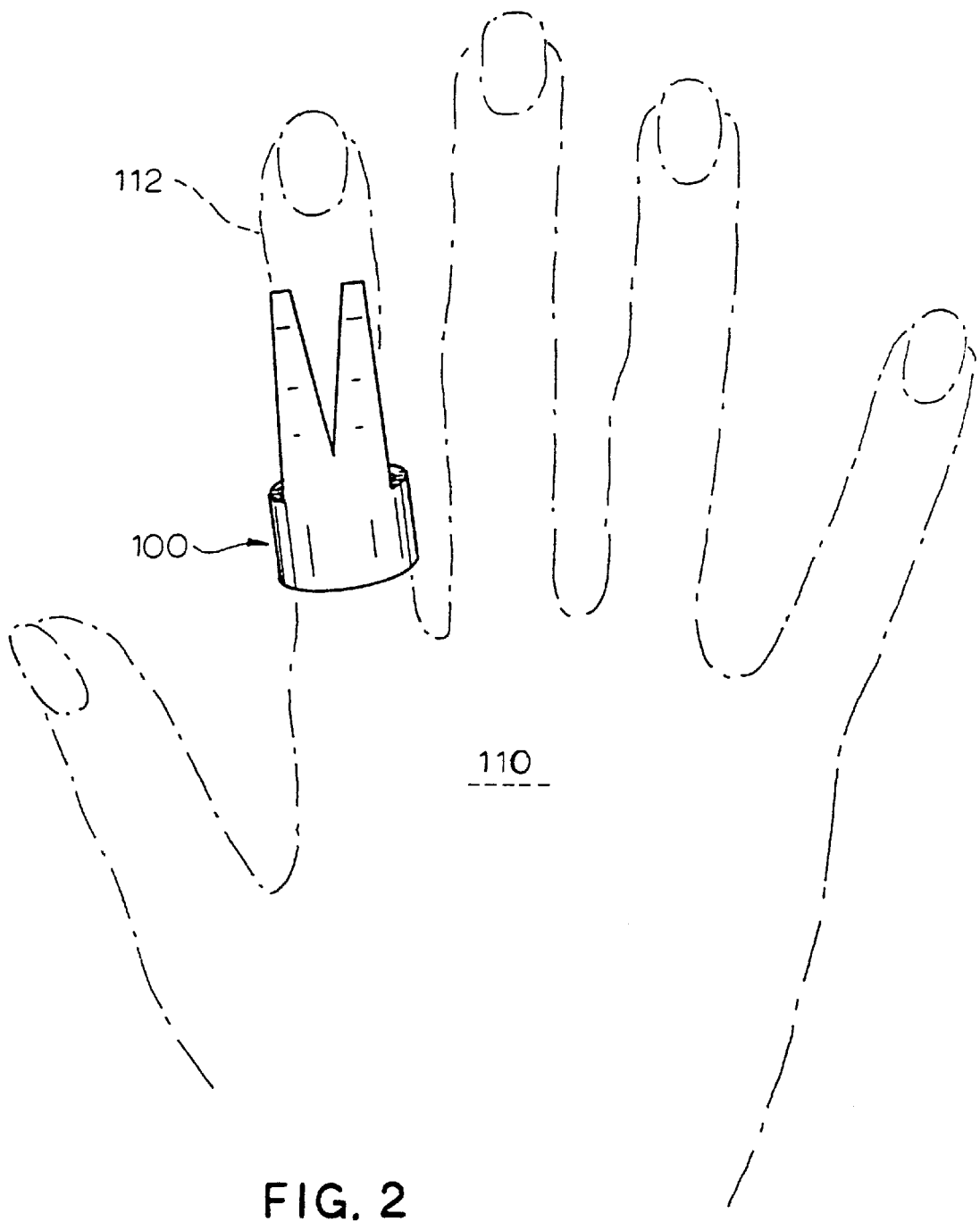
FIG. 2 depicts a top, front, perspective view of finger-mounted, cake decorating device 100 on hand 110.
Figure 4:
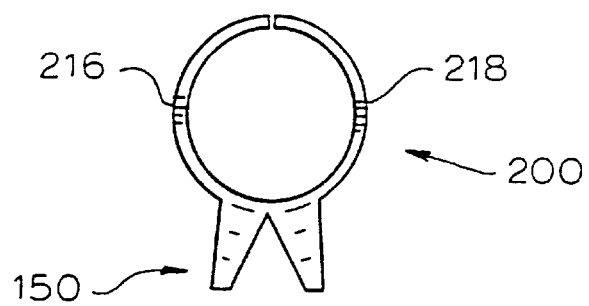
FIG. 4 depicts a top plan view of finger-mounted, cake decorating device 100.
Figure 6:
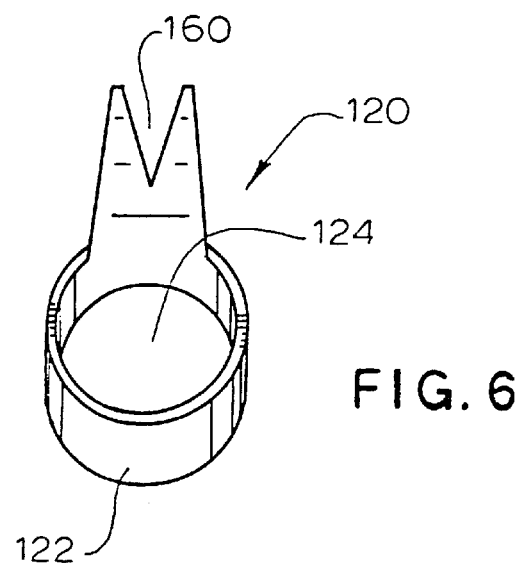
FIG. 6 depicts a top, rear perspective view of finger-mounted, cake decorating device 100.

While FIG. 6 depicts a set finger receiver 120, FIG. 4 depicts an adjustable finger receiver 200. FIG. 4 also depicts an upward arc for platform 150, and specifically first prong 152 and second prong 154. The arc may also be present in FIG. 2 and absent in FIG. 4 as shown in FIG. 2.

Cake decorating blank 210 provides the adjustable finger receiver 200. For FIG. 4, decorating platform 150 is the same as FIG. 2, except for the upward arc.

Figure 3:
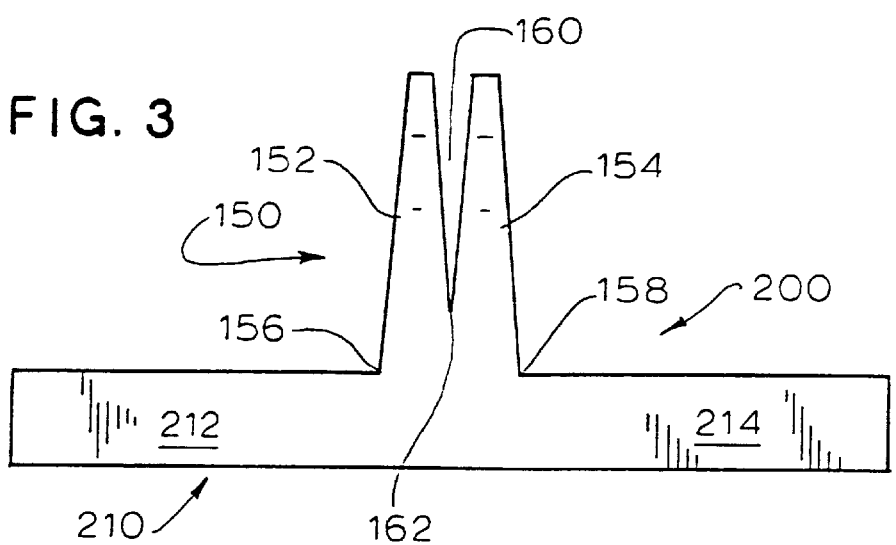
FIG. 3 depicts a cake decorating blank 210 provides the adjustable finger receiver 200 for the finger-mounted, cake decorating device 100.

In FIG. 3, a blank 210 for forming adjustable finger receiver 200 is shown. Blank 210 has a first arm 212 extending from one side at the base of decorating platform 150, while second arm 214 extends from the opposing side at the base of decorating platform 150. First arm 212 is formed into a first arc 216, while second arm 214 is formed into a second arc 218. First arc 216 and second arc 218 combine to form adjustable finger receiver 200.

Figure 7:
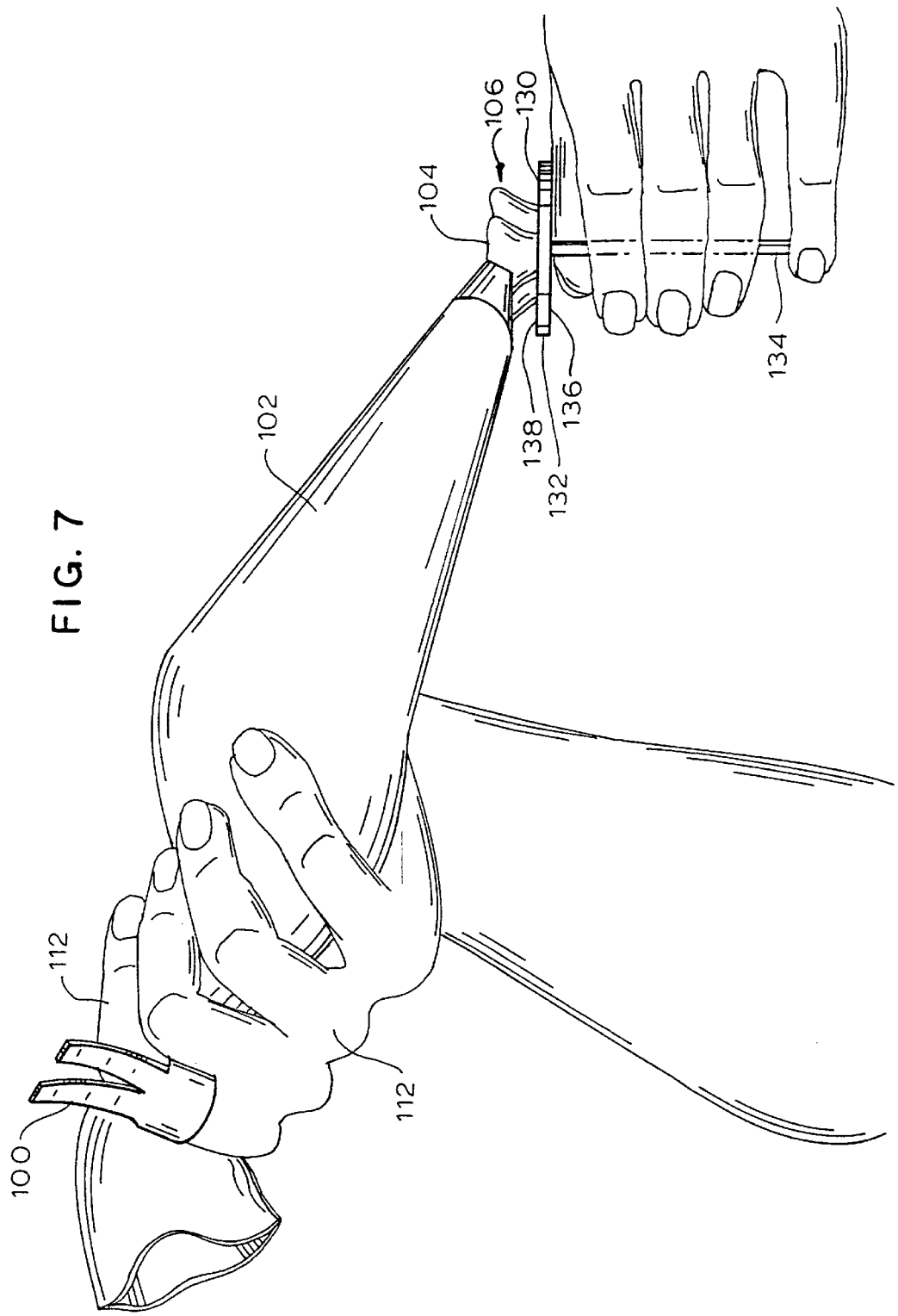
FIG. 7 depicts a perspective view of rose nail 130 in use.
Figure 8:
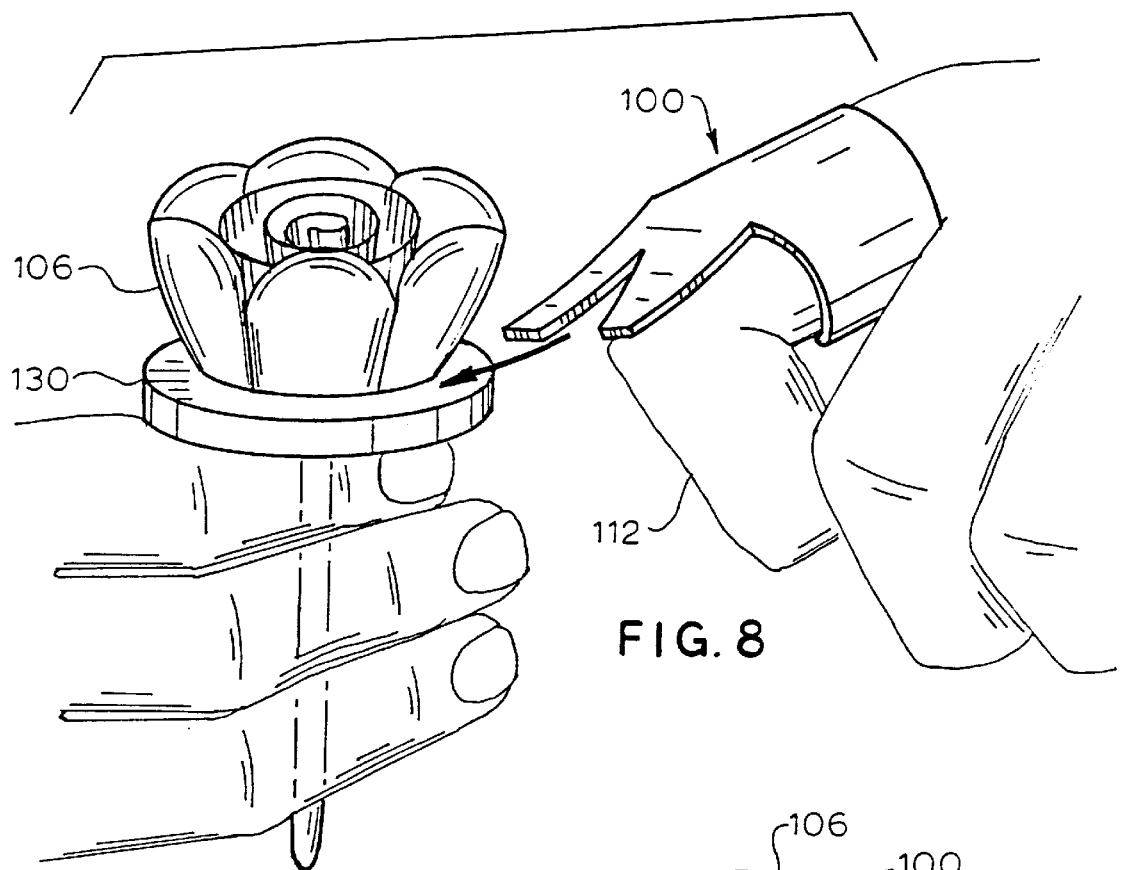
FIG. 8 depicts a top, front perspective view of finger-mounted, cake decorating device 100 in use with rose nail 130.

The preferred manner of using finger mounted device 100 is shown in FIG. 7 and FIG. 8. In FIG. 7, one known manner of using rose nail 130 is shown as receiving the edible material 104 to form design 106. The rose nail 130 includes a flat surface 132 substantially circular in nature and supported by a center rod 134 mounted substantially perpendicular thereto and on a bottom side 136 thereof. Thus rose nail 130 has a top side 138 for receiving edible material 104 oppositely disposed from both bottom side 136 and center rod 134.

Figure 9:
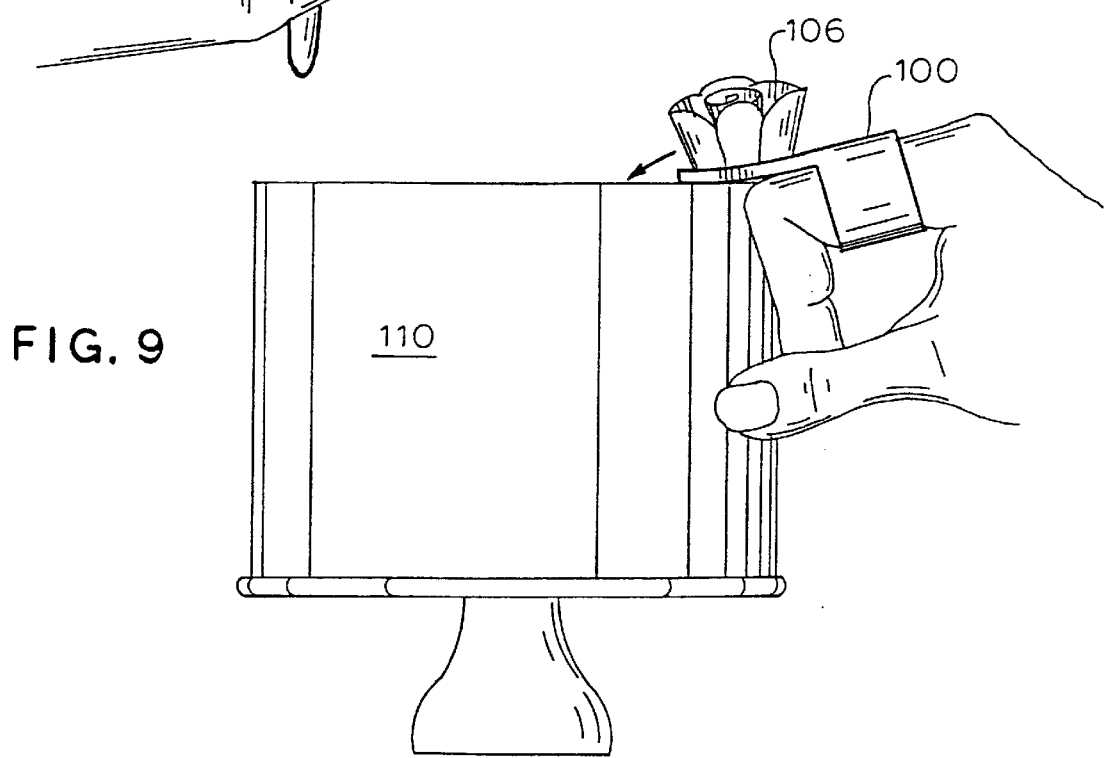
FIG. 9 depicts a top, front perspective view of finger-mounted, cake decorating device 100 in use.

In FIG. 8, finger mounted device 100 is shown as removing design 106 from rose nail 130. The next step is shown in FIG. 9, wherein decoration 106 is removed from finger mounted device 100 onto a cake 110, by a motion, which is clear to person having ordinary skill in the art from this disclosure.

In FIG. 10, finger mounted device 100 is shown as removing design 106 from rod 140 by a upward sliding motion. This procedure permits design 106 to have a substantially centralized opening, which may be left as is or filled as desired.

It is possible to avoid the use of rose nail 130, and the rod 140 and apply the design 106 directly to the finger-mounted, cake decorating device 100 in general, and the decorating platform 150 in order to eliminate one decorating step. Other procedures are more preferred. Rose nail 130 and rod 140 ease the formation of design 106, by permitting a 360 degree rotation of design 106, while it is being formed. Thus, the use of rose nail 130 or rod 140 are preferred.

This application—taken as a whole with the abstract, specification, claims, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modification of this method and apparatus can become clear to a person having ordinary skill in this particular art. Such modifications are clearly covered by this disclosure.

What is claimed and sought to be protected by Letters Patent of the United States is:

1. A food decorating device having a finger receiving means and decoration receiving means, comprising:
   (a) the finger receiving means being adapted to receive a finger with the decoration receiving means positioned adjacent to a nail of the finger;
   (b) the decoration receiving means being adapted to transfer a decoration to a food or receive the decoration for the food as a first step for forming the decoration;
   (c) the decoration receiving means extending from the finger receiving means;
   (d) the food decorating device serving to simplify a decorating process;
   (e) the decoration receiving means having a first prong and a second prong;
   (f) the first prong having a first triangular shape;
   (g) the second prong having a second triangular shape;
   (h) the finger receiving means being selected from the group consisting of an adjustable finger means and a fixed finger means;
   (i) the first prong being similar in shape to the second prong;
   (j) the first prong and the second prong being adapted to receive the decoration;
   (k) the first prong and the second prong serving to transfer the decoration to a desired position;
   (l) the first prong and the second prong having a triangular shaped space therebetween;
   (m) the first prong and the second prong each having the shape of an isosceles triangle; and
   (n) each isosceles triangle having an arm longer than the base.

2. The food decorating device of claim 1 further comprising:
   (a) the decoration receiving means having an upward arc; and
   (b) the triangular shaped space having the shape of an isosceles triangle.

3. The food decorating device of claim 2 further comprising:
   (a) a vertex of the isosceles shape being adjacent to the finger receiving means; and
   (b) a vertex of each isosceles triangle being adjacent a base of the isosceles shape.

4. The food decorating device of claim 3 further comprising:
   (a) a vertex of the isosceles shape being adjacent to a base of each isosceles triangle; and
   (b) each isosceles triangle having an arm longer than the base.

5. The food decorating device of claim 4 further comprising the finger receiving means being the adjustable finger means.

6. The food decorating device of claim 4 further comprising the finger receiving means being the fixed finger means.

* * * * *